US006773081B2

(12) United States Patent
Yuyama et al.

(10) Patent No.: US 6,773,081 B2
(45) Date of Patent: Aug. 10, 2004

(54) CABINET FOR CONVEYING MEDICINE

(75) Inventors: Shoji Yuyama, Toyonaka (JP); Shuji Aoyama, Toyonaka (JP); Akitoshi Honryo, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 0 days.

(21) Appl. No.: 10/200,127

(22) Filed: Jul. 23, 2002

(65) Prior Publication Data

US 2003/0020383 A1 Jan. 30, 2003

(30) Foreign Application Priority Data

Jul. 27, 2001 (JP) ...................................... 2001-227612

(51) Int. Cl.[7] .......................... A47B 97/00; B62D 39/00

(52) U.S. Cl. ................. 312/321; 280/79.3; 280/33.996; 211/133.1

(58) Field of Search ......................... 280/33.996, 47.18, 280/79.3, 47.35, 47.34; 312/321, 128, 257.1, 258, 249.1, 249.8, 249.9, 351; 211/126.1, 133.1, 186, 189, 195

(56) References Cited

U.S. PATENT DOCUMENTS 3,977,689 A 8/1976 Rosa
3,981,510 A 9/1976 Gustafsson
4,456,273 A 6/1984 McKinnon
4,616,890 A 10/1986 Romick
5,125,520 A 6/1992 Kawasaki
5,314,244 A * 5/1994 Swets et al. ............. 312/330.1
5,685,442 A 11/1997 Yoshino et al.
5,743,607 A 4/1998 Teufel et al.
5,957,309 A * 9/1999 Hall ........................ 211/126.2
6,203,035 B1 * 3/2001 Ondrasik ................... 280/79.3

FOREIGN PATENT DOCUMENTS

AU 653172 * 4/1992 .............. 312/249.8
CN 186811 7/1992
DE 195 00 531 7/1996
FR 2 326 112 4/1977

* cited by examiner

*Primary Examiner*—James O. Hansen
(74) *Attorney, Agent, or Firm*—Wenderoth, Lind & Ponack, L.L.P.

(57) ABSTRACT

A cabinet for conveying medicine which occupies a small space when not in use and which can hold the various sizes of medicine buckets. A plurality of medicine bucket supporting members (3a, 3b) for supporting multiple stages of medicine buckets (7) are provided on a movable base member (2). The medicine bucket supporting members (3a, 3b) are juxtaposed on the base member (2) with a predetermined distance therebetween. The medicine bucket supporting members (3a, 3b) are positioned so that, when a plurality of the cabinets (1) are juxtaposed with all of the medicine buckets (7) removed, the medicine bucket supporting members (3a, 3b) do not interfere with the base member (2) of an adjacent cabinet (1). Whereby, the medicine bucket supporting members (3a, 3b) of each cabinet (1) can be disposed so as to abut against each other.

6 Claims, 8 Drawing Sheets

CABINET FOR CONVEYING MEDICINE

BACKGROUND OF THE INVENTION

The present invention relates to a cabinet for conveying medicine which is used when conveying medicine.

Conventionally, when conveying medicine, for example, from a dispensary to each sickroom in a hospital ward, it is a known arrangement that the medicine is put in a bucket which is then stored in a cabinet provided with casters and that the cabinet with the medicine buckets stored in multi-stage is conveyed.

However, as the cabinet described above has a large space occupied by itself, a storage space for the cabinets must be provided in the case that no medicine is conveyed. The more the number of the cabinets, the larger the storage space that is needed for the cabinets.

If all of the medicine buckets have a uniform size, there is a disadvantage that when the number of the medicines to be prescribed to a patient is large, all of the medicines can not be put in the medicine bucket. Conversely, when the number of medicines is small, the redundant space within the medicine bucket increases. Thus, usually, various sizes of medicine buckets have been prepared, which makes the construction of the cabinet for holding such medicine buckets complicated.

SUMMARY OF THE INVENTION

It is an object of the present invention to provide a cabinet for conveying medicine which occupies a small space when not in use and which can hold the various sizes of medicine buckets irrespective of the simple construction.

The present invention, as a means for solving the aforementioned object, provides a cabinet for conveying medicine in which a plurality of medicine bucket supporting members for supporting in multistage medicine buckets in which medicines are put are provided on a movable base member with casters.

The plurality of medicine bucket supporting members are juxtaposed on the base member with a predetermined distance therebetween.

The opposite faces of the plurality of medicine bucket supporting members are provided with support portions for supporting both side edges of the medicine bucket.

The plurality of medicine bucket supporting members are positioned so that, when the plurality of cabinets are juxtaposed with all of the medicine buckets removed, the plurality of medicine bucket supporting members do not interfere with the base member of the adjacent cabinet.

Whereby the medicine bucket supporting members of each cabinet can be disposed so as to abut against each other.

According to the construction above, with all of the medicine buckets removed, the plurality of cabinets can be aligned with each other so that the medicine bucket supporting members of each cabinet can be disposed so as to abut against each other. Thus, even if the number of the cabinets increase, the space occupied by themselves never increases.

Preferably, the plurality of medicine bucket supporting members may be arranged so that the distance therebetween can be adjusted. Thus, even medicine bucket having different widths can be supported.

Preferably, the plurality of medicine bucket supporting members may be pivotably provided with respect to the base member. Thus, when the plurality of cabinets are aligned with each other so that the medicine bucket supporting members of each cabinet can be disposed so as to abut against each other, the medicine bucket supporting members can be pivoted, and thereby the space occupied by the cabinets can be further diminished.

Preferably, an engagement mechanism for disabling to remove the medicine buckets supported on the support portions of the plurality of medicine bucket supporting members may be provided and the engagement mechanism may be arranged so as to be intensively operated from one particular position, which allows easy manipulation.

BRIEF DESCRIPTION OF THE DRAWINGS

Other objects and features of the present invention will become clear from the following detailed description with reference to the accompanying drawings in which.

DETAILED DESCRIPTION OF THE PREFERRED EMBODIMENTS

Figure 1:
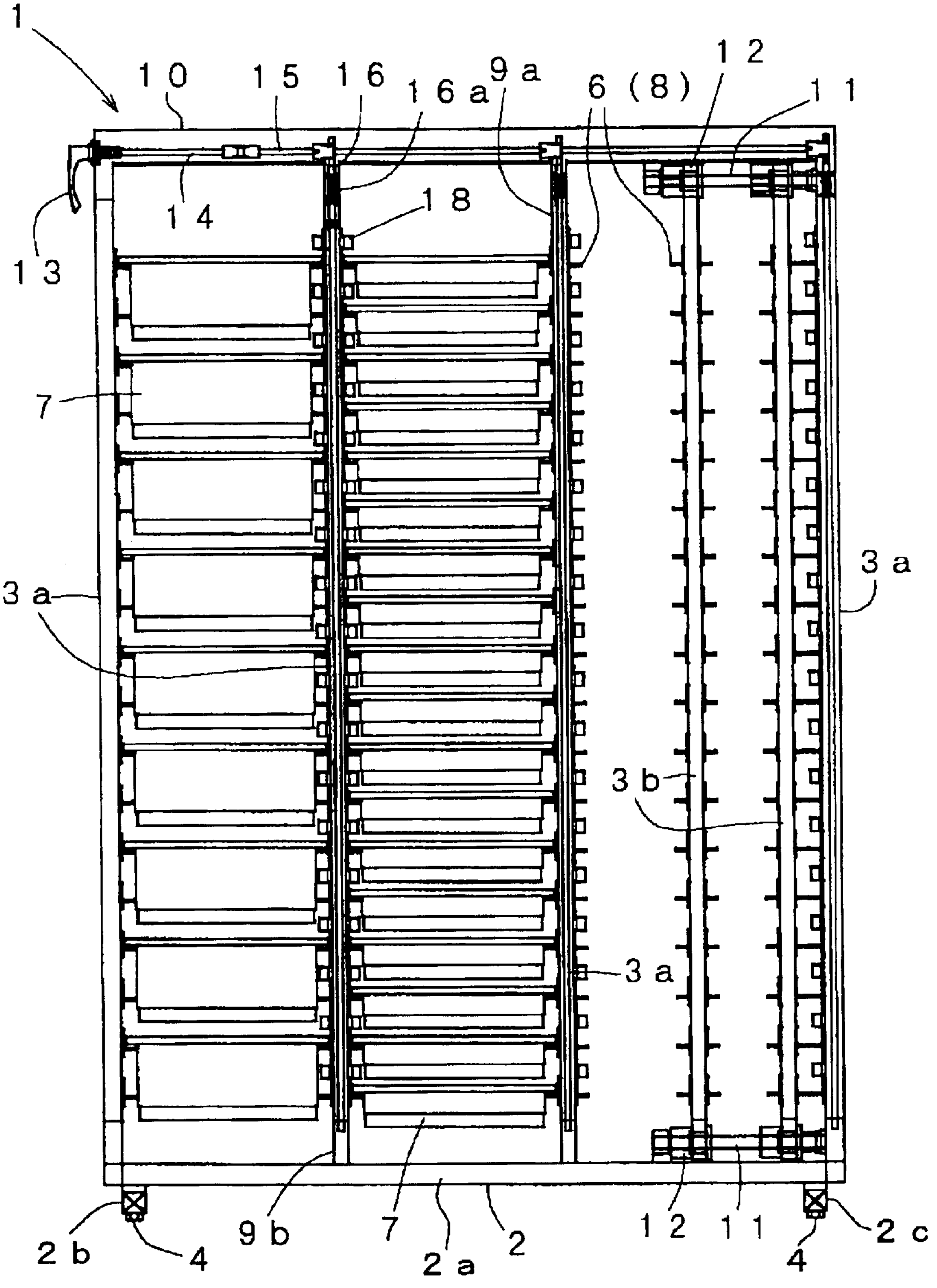
FIG. 1 is a front view of a cabinet for conveying medicine according to an embodiment of the present invention.
Figure 2:
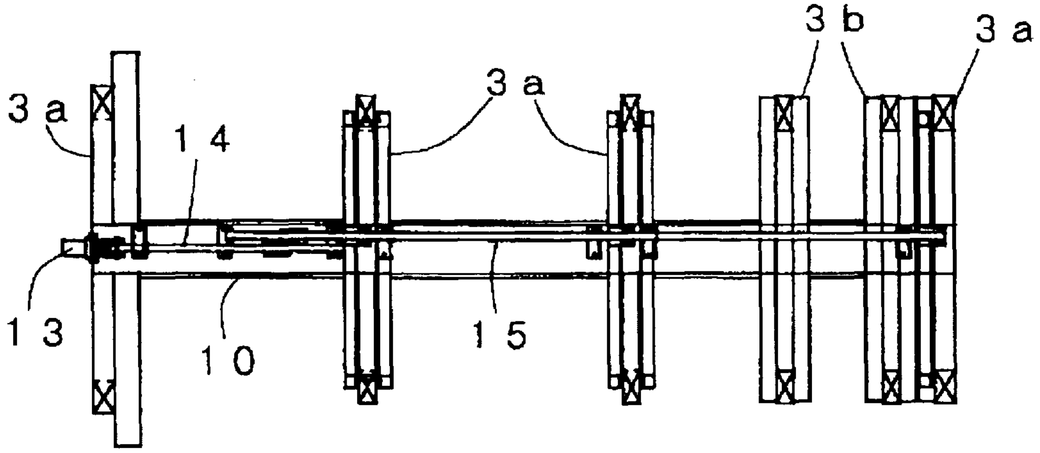
FIG. 2 is a plan view of FIG. 1.

FIG. 1 shows a front view of a cabinet for conveying medicine according to the embodiment of the present invention and FIG. 2 is a plan view thereof. The cabinet 1 is made of stainless steel, steel, and aluminum alloy and so on and comprises a base frame 2 and a plurality of medicine bucket supporting members 3*a*, 3*b* juxtaposed on the base frame 2.

The base frame 2 comprises a base beam 2*a* and cross beams 2*b*, 2*c* connected to the lower surfaces of the both ends of the base beam 2*a* to have a substantially "H" shape and is provided with casters 4 at both ends of the cross beams 2*b*, 2*c* so that the base frame 2 is movable on the floor.

Each of the medicine bucket supporting members 3*a*, 3*b* is formed like a lattice plate having a rectangular shape. On each ledge 5 (FIG. 3) of the member is formed a support edge 6 which protrudes laterally. Both the support edges 6 positioned at opposite portions of adjacent medicine bucket supporting members 3*a*, 3*b* constitute a support portion 8 for supporting a medicine bucket 7.

Each of the medicine bucket supporting members 3*a* positioned at both end portions and two middle portions of the base frame 2 is formed with protrusions 9*a*, 9*b* at the middle portions of the upper and lower ledges 5*a*. The upper protrusions 9*a* are connected with each other by means of an auxiliary beam 10 and the lower protrusions 9*b* are fixed to the base beam 2*a* of the base frame 2 so that the medicine bucket supporting members 3*a* are juxtaposed with a predetermined distance. The protrusions 9*a*, 9*b* allow the medicine bucket supporting members 3*a* to be disposed apart from the base frame 2 and the auxiliary beam 10. The distance between the medicine bucket supporting members 3*a* can be designed to an appropriate dimension in accordance with the size of the medicine buckets 7 to be used.

Figure 3:
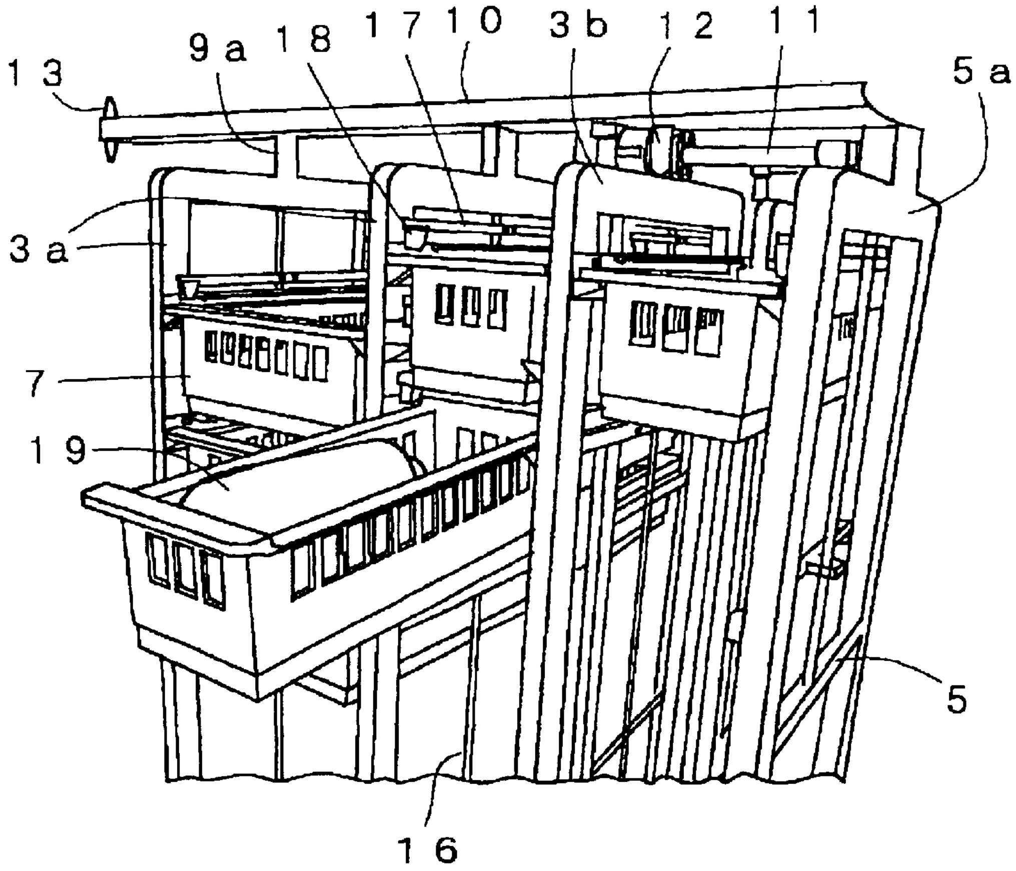
FIG. 3 is a partial perspective view of FIG. 1.
Figure 4:
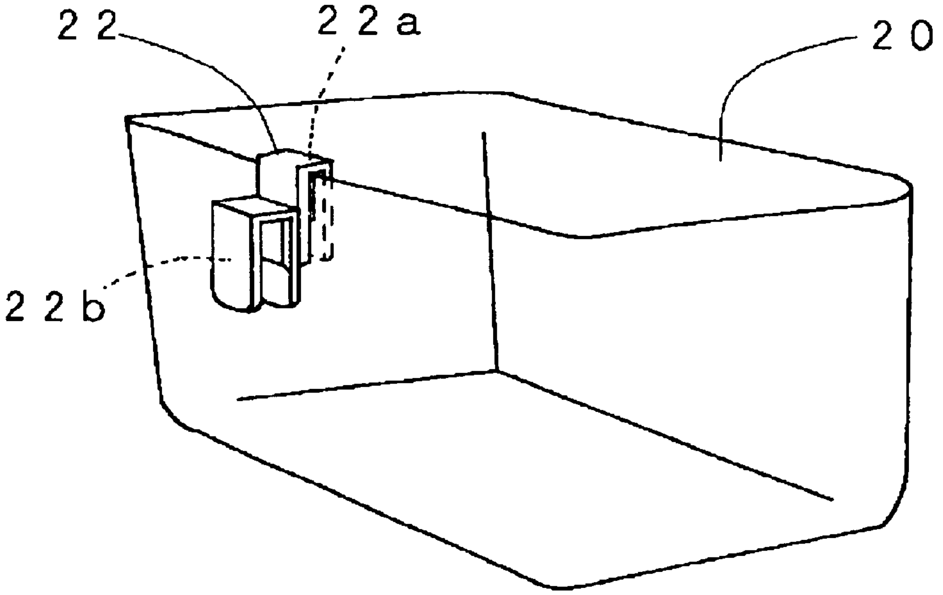
FIG. 4 is a perspective view of a medicine container stored in a medicine bucket of FIG. 1.

Each of the medicine bucket supporting members 3*b* positioned at another two middle portions of the base frame 2 is slidably mounted on slide shafts 11 which are fixed on the base beam 2*a* of the base frame 2 and the auxiliary beam 10 via slide bearings 12 (in FIG. 3 only the upper side is illustrated). For positioning of the medicine bucket supporting members 3*b*, for example, Quick Set Collar® (trade name) and Ball Catch® (not shown) may be used.

One end of the auxiliary beam 10, as shown in FIGS. 1 to 3, is provided with a lock handle 13 which can be rotatably operated. To the lock handle 13 is connected a drive shaft 14 which is connected to a driven shaft 15 via gears. The drive shaft 14, the driven shaft 15 and gears are disposed in the auxiliary beam 10. The driven shaft 15 is connected to vertical rods 16 via rack and pinion mechanisms. Each of the vertical rods 16 is provided in the medicine bucket supporting members 3*a* except one positioned beneath the lock handle 13 and forced to move upward by a spring 16*a*. In a case where the vertical rod 16 is provided in the slidable medicine bucket supporting members 3*b*, it is necessary to constitute the rack and pinion mechanism so that it moves together with the slide motion of the members 3*b*. The vertical rod is formed with arms 16 corresponding to the support edges 6. On both ends of each of the arms are formed engagement protrusions 18 which engage with and disengage from step portions 7*c* formed on flange portions 7*a* of the medicine bucket 7 which will be described hereinafter. Thus, by only intensively operating the lock handle 13 provided in one particular position, it is possible to allow the plurality of medicine buckets 7 supported on the cabinet 1 to be in a lock state or an unlock state. It is also possible to adopt a locking mechanism to the lock handle 13 so that, after the medicine bucket 7 is set, the medicine put in the medicine bucket 7 can not be taken out unless the locking mechanism is unlocked. This surely prevents a third party from stealing a glance at the medicine being conveyed or from freely bringing out the medicine. It is necessary to provide a lid on the uppermost medicine bucket 7 and lock it.

Figure 8:
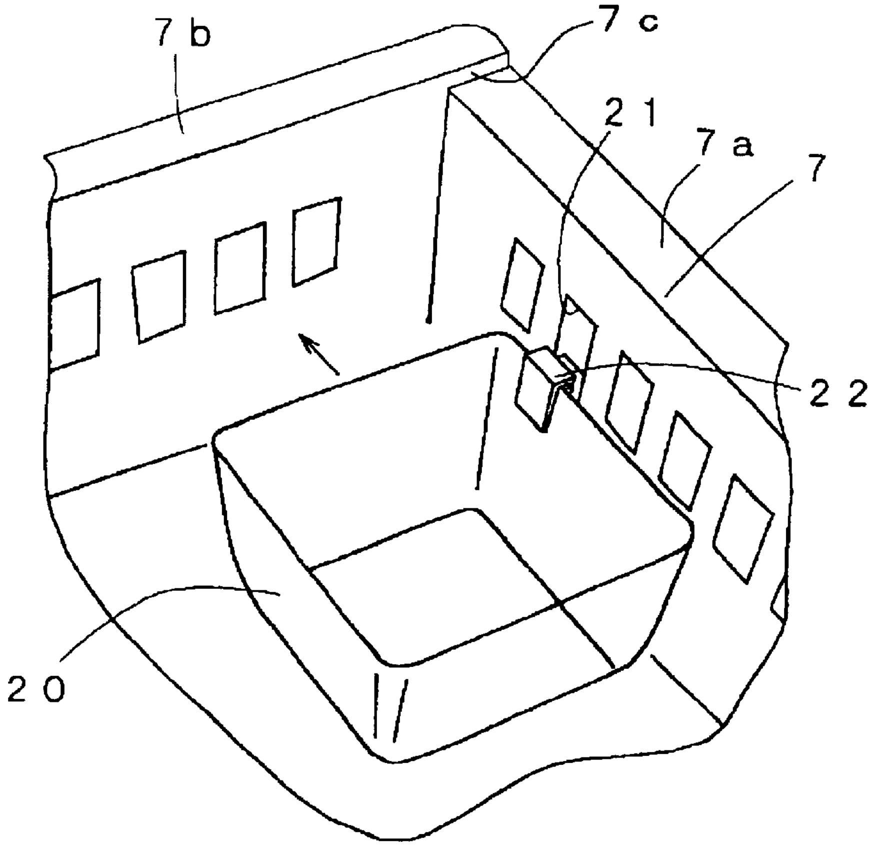
FIGS. 8(*a*), and 8(*b*) are partial perspective views showing an example of the medicine container attached in the medicine bucket.
Figure 8:
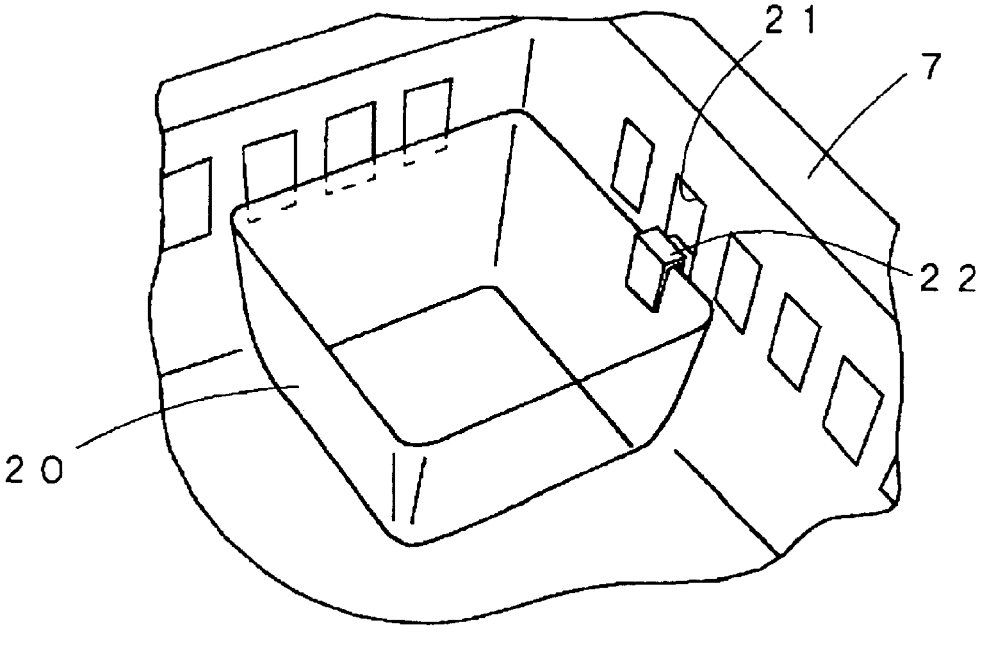

The medicine bucket 7 has a box-like shape that is upwardly open and is made of synthetic resin such as vinyl chloride, polycarbonate, ABS resin and so on. In the present embodiment, four kinds of medicine buckets 7, each having different dimensions of width and height, are used so that a transfusion bag 19 (FIG. 3) and a medicine container 20 can be stored therein. The wide type of medicine bucket 7 can store three transfusion bags 19 juxtaposed horizontally with a space for taking out remaining, while the narrow type of medicine bucket 7 can store one transfusion bag 19. The high type of medicine bucket 7 can store two transfusion bags 19 stacked vertically, while the low type of medicine bucket 7 can store one transfusion bag 19. By providing a vertical side (longitudinal direction) flange portion 7*a* at a lower level than a horizontal side (lateral direction) flange portion 7*b* as shown in FIG. 8(*a*), the upper opening edge of the medicine bucket 7 is formed with a step portion 7*c* which the engagement protrusions 18 interlocked with the lock handle 13 engage with or disengage from. On the side walls of the medicine bucket 7 are formed a plurality of rectangular apertures 21. The apertures 21 are utilized to fit a partition plate (not shown) inside the medicine bucket 7 or to fix a medicine container 20 described hereinafter. The medicine container 20 has a box-like shape that is upwardly open and is made of the same synthetic resin as the medicine bucket 7. The medicine container 20 can contain medicine such as ampoules for one dose administered to a patient. Therefore, in the case of administrating two doses, i.e., morning and evening to a patient, two medicine containers 20 are necessary. The medicine container 20 is fixed in the medicine bucket 7 by means of an engagement member 22. The engagement member 22 is substantially "U" shaped and is made of synthetic resin. The engagement member 22 comprises an engagement arm portion 22*b* for engaging with the rectangular aperture 21 of the medicine bucket 7 and a grip portion 22*a* for gripping the upper opening edge of the medicine container 20, thereby positioning the medicine container 20.

Figure 5:
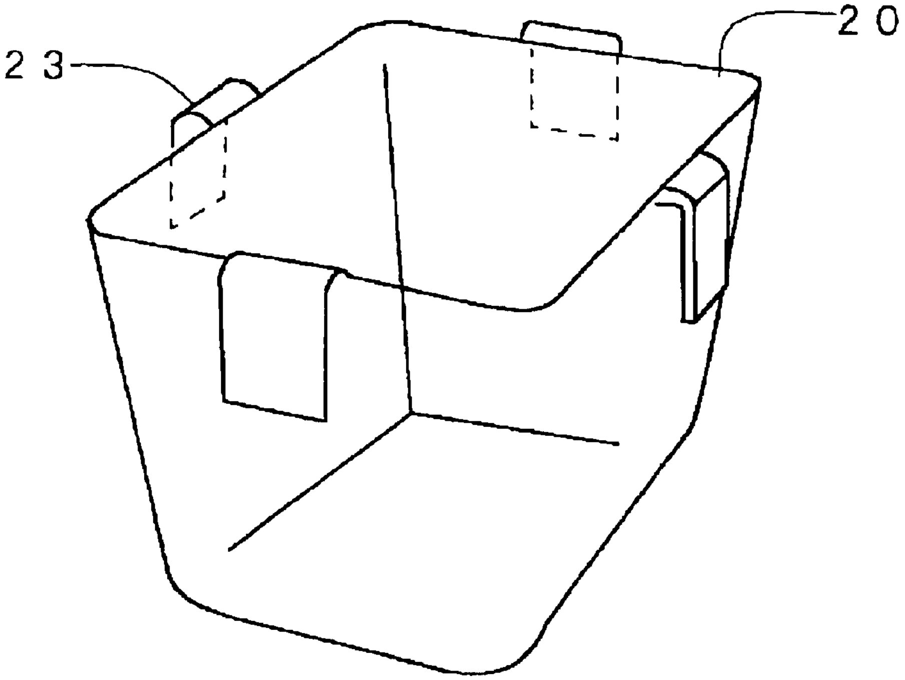
FIG. 5 is a perspective view showing an another example of a medicine container.

The engagement member 22, as shown in FIG. 5, may be an engagement portion 23 integrally formed on the side surface of the medicine container 20.

Figure 6:
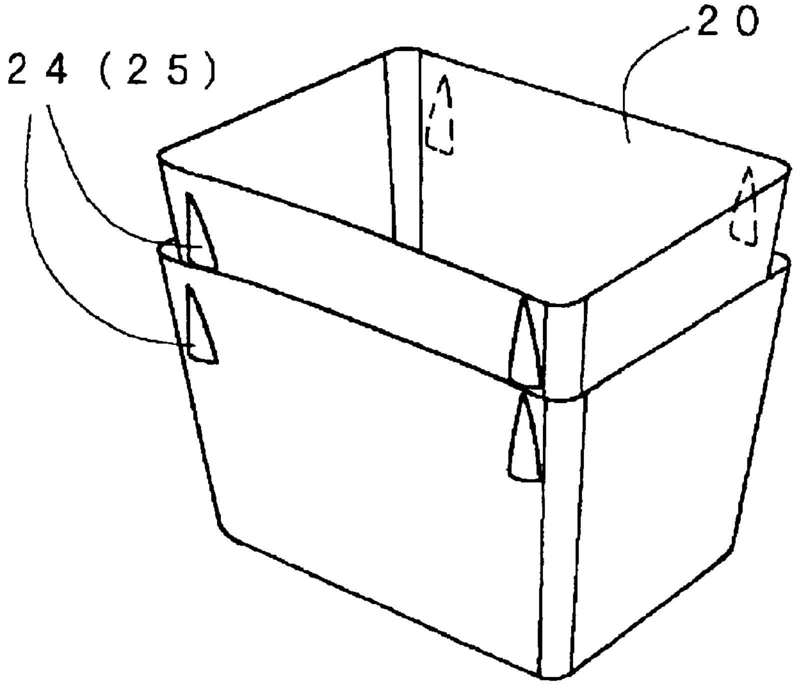
FIG. 6 is a perspective view showing another example of medicine containers in a stacked state.
Figure 7:
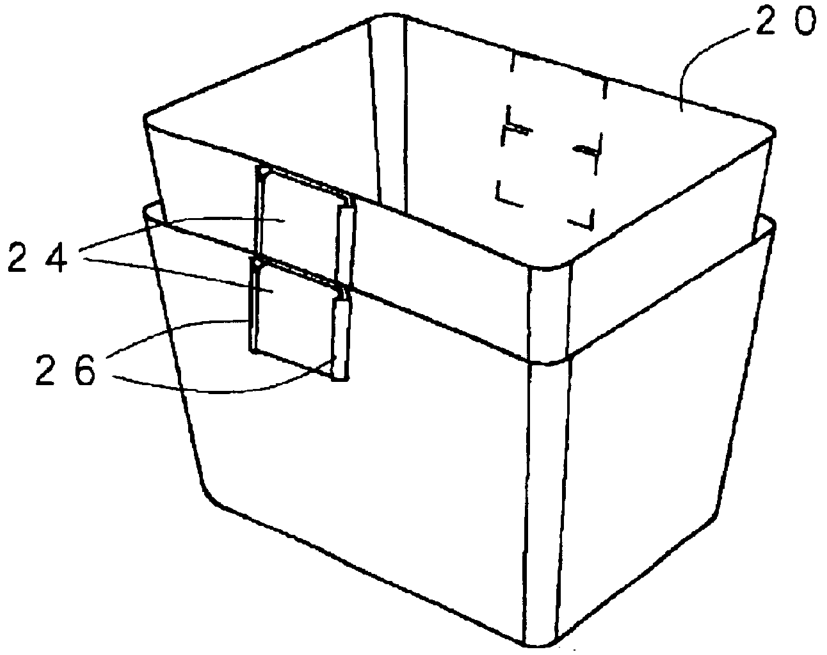
FIG. 7 is a perspective view showing another example of medicine containers in a stacked state.

On the side surface of the medicine container 20 may be formed projection portions 24 as shown in FIG. 6 and FIG. 7. In FIG. 6, each of the projection portions 24 is comprised of a triangular shaped projection 25. When the medicine containers 20 are stacked, the projections 25 of the upper medicine container 20 come into contact with the upper opening edge of the lower medicine container 20, preventing the medicine containers 20 from becoming difficult to be detached from each other due to the fact that the inner and outer surfaces thereof come into close contact with each other. The shape of the projection 25 is not limited to the triangular shape but may be any shape such as an ellipse that can prevent close contact of the stacked medicine containers 20. In FIG. 7, each of the projection portions 24 is comprised of a pair of engagement projections 26 that are spaced from each other. The engagement projections 26 play not only a part of easily detaching the stacked medicine containers 20 but also a part of engaging with the side edges of the rectangular apertures 21 to position the medicine container 20 in the medicine bucket 7.

Use of the cabinet 1 for conveying medicine having the above construction will be described hereinafter.

When conveyance of the medicine is desired, the medicine is put in the medicine bucket 7 which is then supported on the support portion 8. In the case of the transfusion bag 19, it is directly placed in the medicine bucket 7. In the case of other types of medicines, for example, ampoules, packaged medicines and so on, each one dose of the medicines per patient are placed in the medicine containers 20 which are then stored in the medicine bucket 7. The medicine containers 20 are positioned using the engagement members 22. The medicine container 20, as shown in FIG. 8(*a*), can be securely positioned by using any of the plurality of rectangular apertures 21 formed on the side walls of the medicine bucket 7. After being positioned by the engagement member 22, as shown in FIG. 8(*b*), the medicine container 20 can be slid with respect to the engagement member 22 so that the medicine container 20 is positioned, for example, at the corner of the medicine bucket 7. This arrangement prevents the disadvantage that the medicines, which have been grouped every patients or every kinds of medicines, exist in a mixture during the movement of the cabinet 1. The slidable medicine bucket supporting members 3*b* may be slid based on the size of the medicine bucket 7 to be used to set an appropriate distance. This allows the medicine bucket 7 to be properly supported irrespective of the size thereof.

Once setting of the medicine buckets 7 is completed, the lock handle 13 is turned so that the engagement portions 23 engages with the step portions 7*c* of the medicine bucket 7, and thereby the medicine buckets 7 are in a lock state. This prevents the medicine buckets 7 from falling from the cabinet 1 or the medicines from falling off the medicine bucket 7 when moving the cabinet 1, to for example, a hospital ward.

Figure 9:
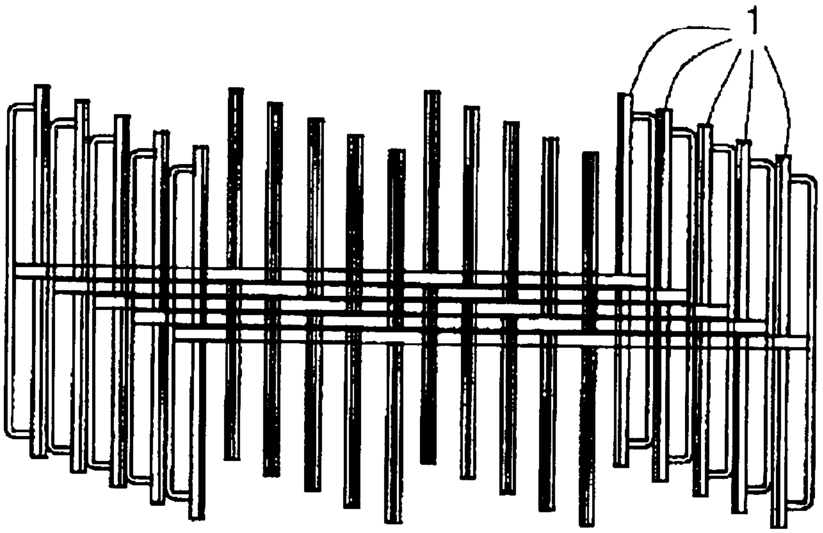
FIG. 9 is a plane view showing a storage state of the cabinets for conveying medicine of FIG. 1.

When not in use, in order to store the plurality of cabinets 1, after all of the medicine buckets 7 are removed, the cabinets 1 are disposed so that they abut against each other as shown in FIG. 9. Since the medicine bucket supporting members 3*a*, 3*b* are positioned between the base beam 2*a* of the base frame 2 and the auxiliary beam 10 via the protrusions 9*a*, 9*b*, they do not interfere with each other. Therefore, even if the plurality of cabinets 1 are stored, the space occupied by them can be reduced.

Figure 10:
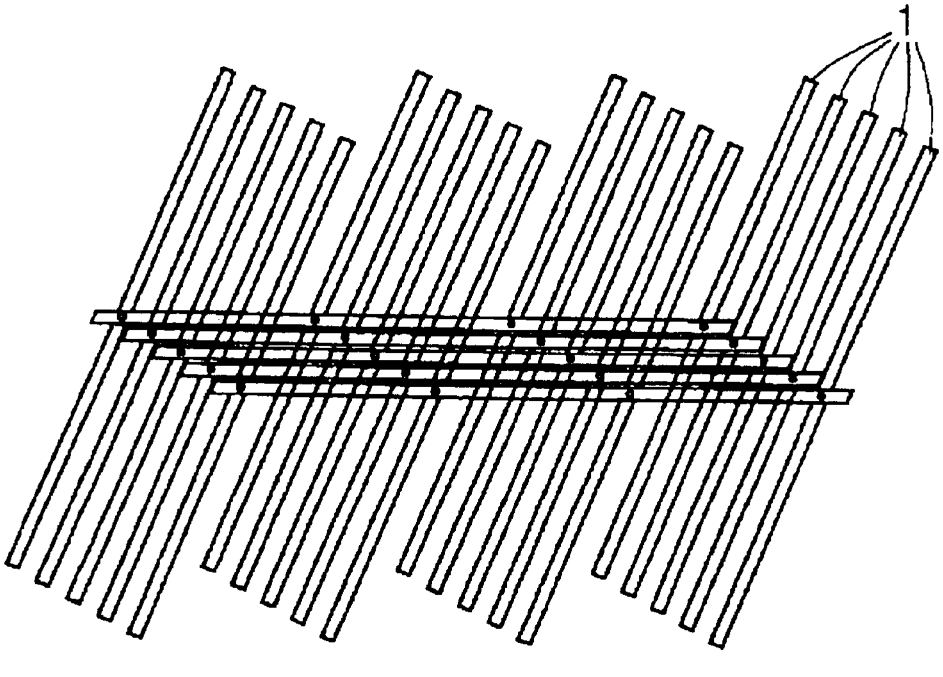
FIG. 10 is a plan view showing a storage state of another example of cabinets for conveying medicine.
Figure 11:
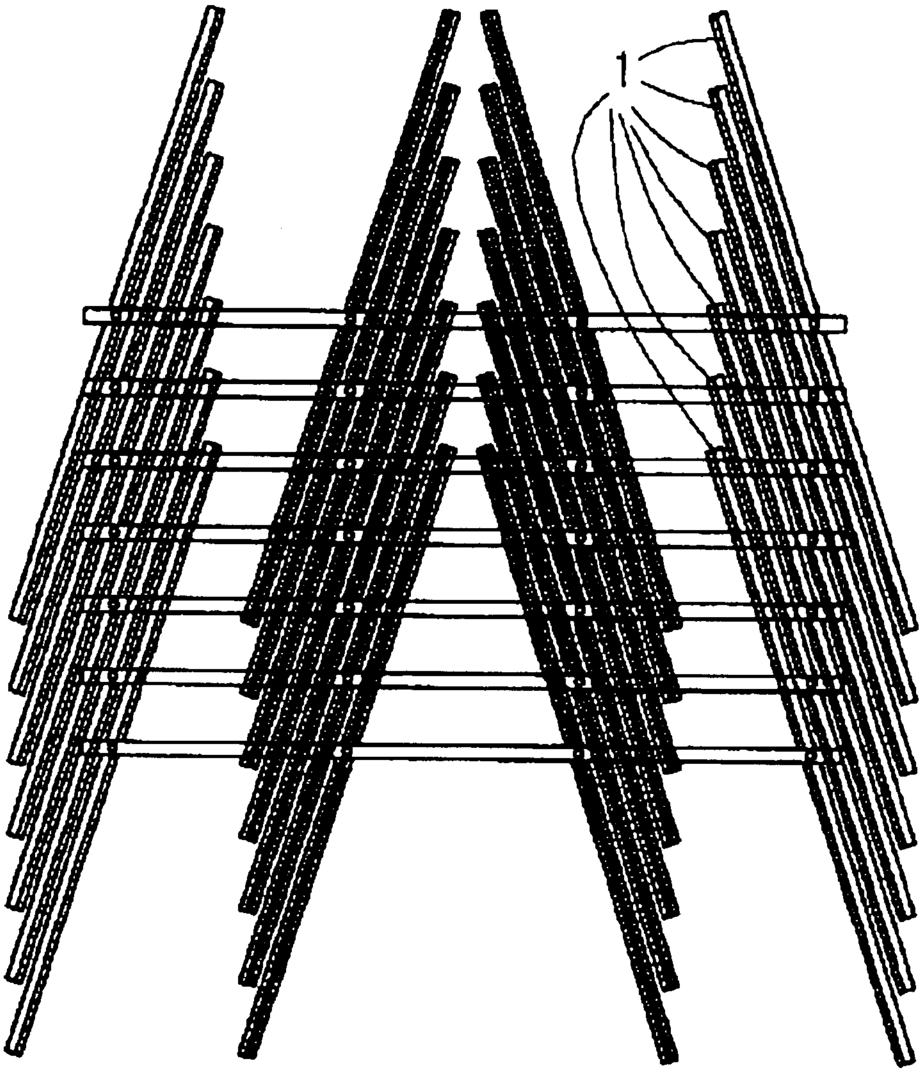
FIG. 11 is a plan view showing a storage state of another example of cabinets for conveying medicine.

The medicine bucket supporting members 3*a*, 3*b* may be pivotably provided with respect to the base beam 2*a* the base frame 2 and the auxiliary beam 10 so that all of the members 3*a*, 3*b* as shown in FIG. 10 can be pivoted in the same direction, or two members at the middle can be pivoted so as to be broadened toward the front side and two members at both ends can be pivoted so as so be parallel to the adjacent middle members. Thus, the space occupied by the cabinets 1 can be further reduced.

Figure 12:
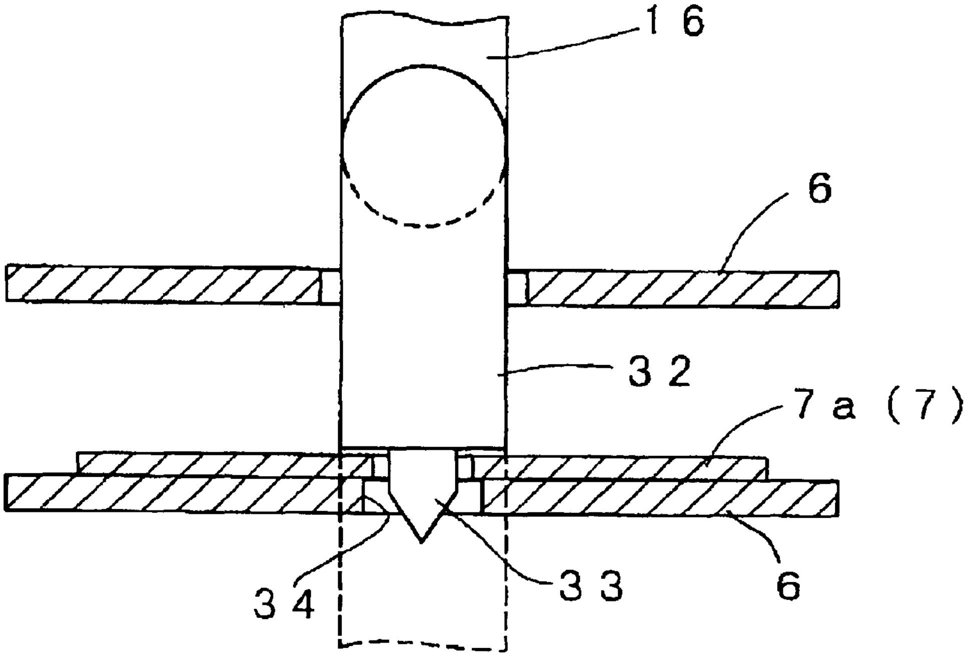
FIG. 12 is a sectional view showing an example for locking the medicine bucket in the cabinet for conveying medicine.

The positioning of the medicine bucket 7 in the cabinet 1 may be achieved by adopting an arrangement as shown in FIG. 12. Namely, from the vertical rod 16 is extended an arm 32 on the end of which is formed an engagement projection 33. The engagement projection 33 engages with the engagement hole 34 formed in the flange portion 7*a* of the medicine bucket 7.

Figure 13:
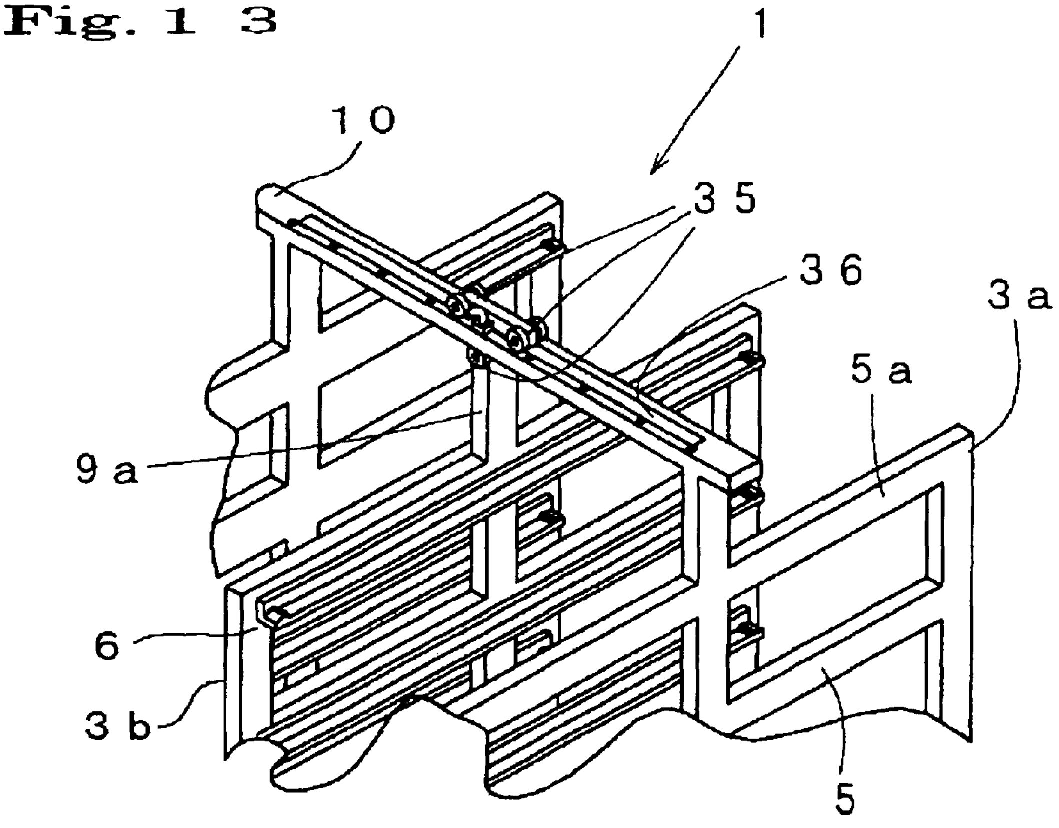
FIG. 13 is a partial perspective view showing another example of medicine bucket supporting members slidably provided.

All of the medicine bucket supporting members 3*a*, 3*b* may be fixed on the base frame 2 and the auxiliary beam 10. The slide mechanism may be arranged as shown in FIG. 13. Namely, the upper and lower protrusions 9*a*, 9*b* of the medicine bucket supporting member 3*b* may be inserted through guide grooves 36 formed on the base frame 2 and the auxiliary beam 10 and provided with plural pairs of rollers 35 so that the medicine bucket supporting member 3*b* can be slid along the guide grooves 36.

Although the present invention has been fully described by way of the examples with reference to the accompanying drawings, it is to be noted that various changes and modifications will be apparent to those skilled in the art. Therefore, unless such changes and modifications otherwise depart from the spirit and scope of the present invention, they should be construed as being included therein.

What is claimed is:

1. A cabinet for conveying medicine, the cabinet comprising:

a movable base member provided with a plurality of casters, the movable base member comprising a base beam and cross beams connected at opposite ends of the base beam, respectively, wherein the base beam and cross beams are arranged so as to define a substantially H-shaped member;

an auxiliary beam;

a plurality of medicine bucket supporting members for supporting medicine buckets in multiple stages, the medicine bucket supporting members extending between the movable base member and the auxiliary beam so as to be juxtaposed with a predetermined distance therebetween, wherein a lower edge of each of the plurality of medicine bucket supporting members is connected to the base beam with a predetermined distance therebetween, wherein an upper edge of each of the plurality of medicine bucket supporting members is connected to the auxiliary beam with a predetermined distance therebetween, wherein opposing faces of the plurality of medicine bucket supporting members are provided with support portions for supporting opposite side edges of each of the medicine buckets, wherein the plurality of medicine bucket supporting members are positioned so that, when a plurality of the cabinets are juxtaposed with all of the medicine buckets removed, the plurality of medicine bucket supporting members do not interfere with the base member of an adjacent one of the cabinets, wherein the medicine bucket supporting members of each cabinet can be disposed so as to abut against each other;

an engagement mechanism for preventing removal of the medicine buckets supported on the support portions of the plurality of medicine bucket supporting members, wherein the engagement mechanism is arranged so as to be operable from one particular position.

2. The cabinet as claimed in claim 1, wherein the plurality of medicine bucket supporting members are arranged so that the distance therebetween can be adjusted.

3. The cabinet as claimed in claim 1, wherein the plurality of medicine bucket supporting members are pivotable with respect to the base member.

4. The cabinet as claimed in claim 1, wherein each of the plurality of medicine bucket supporting members includes an upper protrusion that is received in the auxiliary beam.

5. The cabinet as claimed in claim 1, wherein each of the plurality of medicine bucket supporting members includes a lower protrusion that is secured to the base beam of the movable base member.

6. The cabinet as claimed in claim 1, wherein the plurality of medicine bucket supporting members are positioned to permit the medicine buckets to be supported in a plurality of columns.

* * * * *